US012333992B2

(12) United States Patent
Li et al.

(10) Patent No.: US 12,333,992 B2
(45) Date of Patent: Jun. 17, 2025

(54) DISPLAY DEVICE AND VOLTAGE DROP COMPENSATION CIRCUIT

(71) Applicants: Chengdu BOE Optoelectronics Technology Co., Ltd., Sichuan (CN); BOE Technology Group Co., Ltd., Beijing (CN)

(72) Inventors: Qiang Li, Beijing (CN); Chengte Lai, Beijing (CN); Chengjie Zhao, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/273,054

(22) PCT Filed: Jan. 28, 2022

(86) PCT No.: PCT/CN2022/074551
§ 371 (c)(1),
(2) Date: Jul. 19, 2023

(87) PCT Pub. No.: WO2023/141930
PCT Pub. Date: Aug. 3, 2023

(65) Prior Publication Data
US 2024/0386837 A1 Nov. 21, 2024

(51) Int. Cl.
*G09G 3/20* (2006.01)

(52) U.S. Cl.
CPC ... *G09G 3/2096* (2013.01); *G09G 2320/0233* (2013.01); *G09G 2320/0242* (2013.01);
(Continued)

(58) Field of Classification Search
CPC ........ G09G 3/00; G09G 2330/00; G09G 3/32; G09G 3/36
See application file for complete search history.

(56) References Cited

U.S. PATENT DOCUMENTS 6,522,119 B1 2/2003 Hernandez
6,841,984 B2 1/2005 Hernandez
(Continued)

FOREIGN PATENT DOCUMENTS

CN 1586061 A 2/2005
CN 208954610 U 6/2019
(Continued)

OTHER PUBLICATIONS

International Search Report issued Nov. 3, 2022 in corresponding International Patent Application No. PCT/CN2022/074551, 4 pages.
(Continued)

*Primary Examiner* — Van N Chow
(74) *Attorney, Agent, or Firm* — XSENSUS LLP

(57) ABSTRACT

The present disclosure provides a display device and voltage drop compensation circuit. The display device includes a signal source part, a display part and a transmission part, and the signal source part is connected to the display part through the transmission part. The signal source part includes a power supply module including a voltage output end for outputting a power supply signal and a voltage feedback end for obtaining a feedback voltage signal, and the power supply module is used to adjust the power supply signal based on the feedback voltage signal. The transmission part includes: a first transmission line with a first end connected to the voltage output end and a second end outputting the power supply signal; and a second transmis-
(Continued)

sion line, including a first end connected to the voltage feedback end and a second end connected to the second end of the first transmission line.

17 Claims, 11 Drawing Sheets

(52) U.S. Cl.
CPC ............... *G09G 2320/0247* (2013.01); *G09G 2330/028* (2013.01)

(56) References Cited

U.S. PATENT DOCUMENTS

| | | | |
|---|---|---|---|
| 10,201,046 B2 | 2/2019 | Hasegawa et al. | |
| 2003/0098673 A1 | 5/2003 | Hernandez | |
| 2015/0035441 A1 | 2/2015 | Hasegawa et al. | |
| 2015/0115905 A1* | 4/2015 | Hui | H02J 3/18 323/207 |
| 2017/0009743 A1* | 1/2017 | Brogan | F03D 7/042 |
| 2017/0009744 A1* | 1/2017 | Brogan | H02J 3/36 |

FOREIGN PATENT DOCUMENTS

| | | | |
|---|---|---|---|
| CN | 110062493 | A | 7/2019 |
| CN | 110780222 | A | 2/2020 |
| CN | 111223461 | A | 6/2020 |
| DE | 3511625 | A1 | 10/1986 |
| WO | 03024039 | A2 | 3/2003 |

OTHER PUBLICATIONS

Written Opinion of the International Searching Authority issued Nov. 3, 2022 in corresponding International Patent Application No. PCT/CN2022/074551, 3 pages.

* cited by examiner

DISPLAY DEVICE AND VOLTAGE DROP COMPENSATION CIRCUIT

CROSS-REFERENCE TO RELATED APPLICATIONS

The present application is a U.S. National Stage of International Application No. PCT/CN2022/074551 filed on Jan. 28, 2022, the entire contents thereof are incorporated herein by reference.

TECHNICAL FIELD

The present disclosure relates to the field of display technology, in particular, to a display device and a voltage drop compensation circuit.

BACKGROUND

An organic light emitting diode (OLED) is an active light-emitting display device with the advantages of self-illumination, wide viewing angle, high contrast ratio, low power consumption, very high response speed, and being thin and light, and bendable and so on. With the continuous development of display technology, the display device by using the OLED as the light-emitting device is becoming more and more widely used. In the related art, as for the vehicle-mounted OLED applications of medium and large sizes, there are abnormalities in the screen display due to voltage loss.

It is to be noted that the above information disclosed in the Background section is only for enhancement of understanding of the background of the present disclosure and therefore it may contain information that does not form the prior art that is already known to a person skilled in the art.

SUMMARY

The present disclosure is to provide a display device and a voltage drop compensation circuit.

An aspect of the present disclosure provides a display device, including a signal source part, a display part and a transmission part, and the signal source part being connected to the display part through the transmission part, wherein the signal source part includes: a power supply module, including a voltage output end and a voltage feedback end, the voltage output end being configured to output a power supply signal, the voltage feedback end being configured to obtain a feedback voltage signal, and the power supply module being configured to adjust the power supply signal based on the feedback voltage signal, the transmission part includes: a first transmission line, including a first end connected to the voltage output end and a second end outputting the power supply signal; and a second transmission line, provided separately from the first transmission line, and including a first end connected to the voltage feedback end and a second end connected to the second end of the first transmission line.

In an exemplary embodiment of the present disclosure, the transmission part includes: a first connector, connected to the signal source part and including a first pin and a second pin, the first pin being connected to the first transmission line, the second pin being connected to the second transmission line, and the first connector being connected to the voltage output end through the first pin and to the voltage feedback end through the second pin; and a second connector, connected to the display part, the first transmission line being connected to the second transmission line at an end of the second connector.

In an exemplary embodiment of the present disclosure, the display device includes a plurality of the transmission parts, wherein the signal source part includes a plurality of the power supply modules, and the plurality of the power supply modules are configured to output a plurality of different power supply signals, and wherein the plurality of the transmission parts are provided in one-to-one correspondence with the plurality of the power supply modules.

In an exemplary embodiment of the present disclosure, the plurality of the power supply modules include a first power supply module, a second power supply module and a third power supply module, the first power supply module is configured to output a first power supply signal, the second power supply module is configured to output a second power supply signal and the third power supply module is configured to output a third power supply signal, and voltage magnitudes of the first power supply signal, the second power supply signal, and the third power supply signal are different from each other, wherein the plurality of the transmission parts include a first transmission part, a second transmission part and a third transmission part, and wherein the first transmission part and the second transmission part are provided on a first circuit board, and the third transmission part is provided on a second circuit hoard.

In an exemplary embodiment of the present disclosure, the transmission part includes a first conductive layer and a second conductive layer, and the first conductive layer is insulated from the second conductive layer, and the second connector includes a third pin, and the third pin is connected to the first transmission line, and wherein the first pin, the second pin, the first transmission line and the second transmission line are all located in the first conductive layer, and the third pin is located in the second conductive layer; or the first pin, the second pin, the first transmission line and the second transmission line are all located in the second conductive layer, and the third pin is located in the first conductive layer; or the first pin and the second pin are located in the first conductive layer, and the first transmission line, the second transmission line and the third pin all are located in the second conductive layer; or the first pin and the second pin are located in the second conductive layer, and the first transmission line, the second transmission line and the third pin all are located in the first conductive layer; or the first pin, the second pin, the first transmission line, the second transmission line and the third pin are located in the first conductive layer or the second conductive layer.

In an exemplary embodiment of the present disclosure, the first connector includes a plurality of the first pins, and the plurality of the first pins are provided in parallel, and the second connector includes a plurality of the third pins, and the plurality of the third pins are provided in parallel, and wherein the plurality of the first pins are each connected to a first end of the first transmission line, and the plurality of the third pins are each connected to the second end of the first transmission line.

in an exemplary embodiment of the present disclosure, the first pin, the second pin, the first transmission line and the second transmission line are all located in the first conductive layer, and the third pin is located in the second conductive layer, the first transmission part and the second transmission part each includes: a first conductive part, provided at the end of the second connector, located in the first conductive layer, and connected to the second end of the first transmission line; and a second conductive part, located in the second conductive layer, provided to be opposite to the first conductive part, and connected to the first conductive part through a via hole, and wherein in a same transmission part, the second conductive part is further connected to the second transmission line and to each of the plurality of the third pins.

In an exemplary embodiment of the present disclosure, a width of the second conductive part is greater than a width of the first conductive part.

In an exemplary embodiment of the present disclosure, a line width of the first transmission line is greater than a line width of the second transmission line.

In an exemplary embodiment of the present disclosure, in the first transmission part, a line width of the first transmission line is d1, a line width of the second transmission line is d2, and d1/d2 is greater than or equal to 8 and less than or equal to 10; in the second transmission part, the line width of the first transmission line is d3, the line width of the second transmission line is d4, and d3/d4 is greater than or equal to 8 and less than or equal to 10; and in the third transmission part, the line width of the first transmission line is d5, the line width of the second transmission line is d6, and d5/d6 is greater than or equal to 2 and less than or equal to 4.

In an exemplary embodiment of the present disclosure, d1/d5 is greater than or equal to 2 and less than or equal to 4, and d3/d5 is greater than or equal to 2 and less than or equal to 4.

In an exemplary embodiment of the present disclosure, in the first transmission part, a number of the third pins is greater than a number of the first pins, in the second transmission part, the number of the third pins is greater than the number of the first pins, and in the third transmission part, the number of the third pins is the same as the number of the first pins.

In an exemplary embodiment of the present disclosure, the second connector in the first transmission part and that in the second transmission part each includes 9 third pins, and the second connector in the third transmission part includes 3 third pins.

In an exemplary embodiment of the present disclosure, the display device further includes an adapter part, the adapter part includes an end connected to the signal source part and another end connected to a first end of the first transmission part, a first end of the second transmission part and a first end of the third transmission part, and a second end of the first transmission part, a second end of the second transmission part and a second end of the third transmission part are connected to the display part.

Another aspect of the present disclosure provides a voltage drop compensation circuit, applied to the display device as described in any embodiment of the present disclosure, the voltage drop compensation circuit includes: a power supply module, provided in a signal source part and including a voltage output end configured to output a power supply signal, and a feedback voltage end configured to obtain a feedback voltage signal; and a voltage division module, including an input end connected to the voltage output end and an output end connected to the feedback voltage end, and configured to determine, according to a predetermined voltage division ratio, the feedback voltage signal based on an output voltage signal of the voltage output end, wherein the power supply module is configured to adjust the power supply signal output from the voltage output end based on the feedback voltage signal.

In an exemplary embodiment of the present disclosure, the voltage division module includes: a first resistor, including a first end as the input end of the voltage division module; and a second resistor, including a first end, as the output end of the voltage division module, connected to a second end of the first resistor, and a second end being grounded.

In an exemplary embodiment of the present disclosure, the voltage drop compensation circuit further includes: a filter capacitor, including an end connected to the input end of the voltage division module and another end connected to the output end of the voltage division module.

It should be understood that the above general description and the detailed descriptions that follow are only exemplary and explanatory and do not limit the present disclosure.

BRIEF DESCRIPTION OF THE DRAWINGS

The accompanying drawings herein are incorporated into and form part of the specification, illustrate embodiments consistent with the present disclosure, and are used in conjunction with the specification to explain the principles of the present disclosure. It will he apparent that the accompanying drawings in the following description are only some embodiments of the present disclosure, and that according to these accompanying drawings, a person skilled in the art may obtain other accompanying drawings without creative effort.

DETAILED DESCRIPTION

Figure 1:
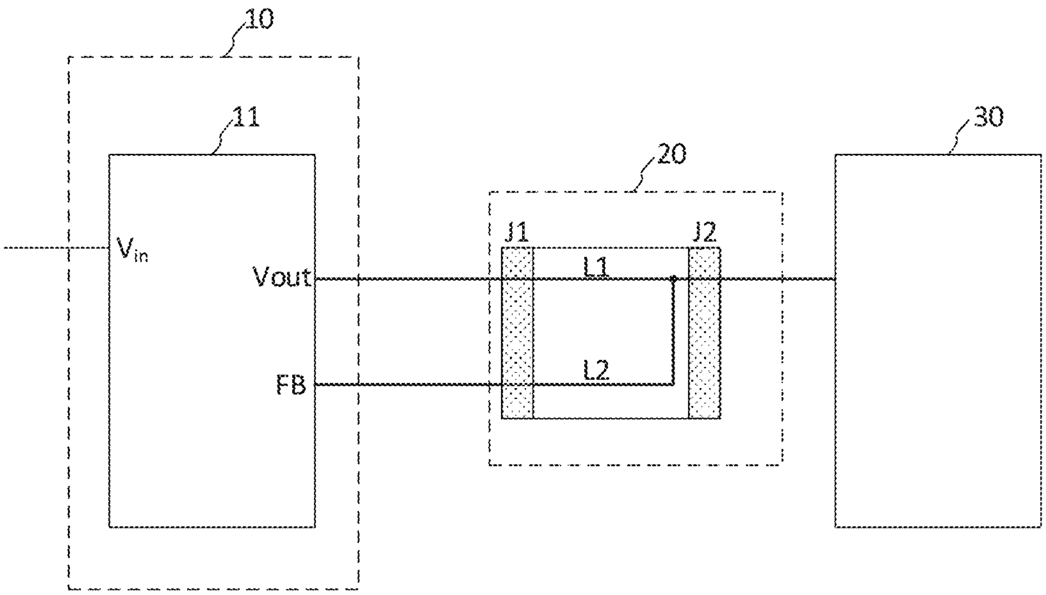
FIG. 1 is a schematic structure diagram of a display device according to an embodiment of the present disclosure.

Example embodiments will now be described more fully with reference to the accompanying drawings. Example embodiments, however, may be embodied in various forms and should not be construed as limited to the examples set forth herein; rather, these embodiments are provided so that the present disclosure will be thorough and complete, and the concept of example embodiments would be fully conveyed to those skilled in the art, The same reference numerals in the drawings denote the same or similar structures, and thus their detailed descriptions will be omitted. In addition, the accompanying drawings are only schematic illustrations of the present disclosure and are not necessarily to scale.

Although relative terms such as "up" and "down" are used in this specification to describe the relative relationship of one component with another component shown, these terms are used in this specification only for convenience of the description, for example according to the example orientation described in the accompanying drawings. It is to be understood that if a device shown is turned upside down, the component described as being "up" will become the component described as being "down". When a structure is "on" another structure, it may mean that the structure is integrally formed on said another structure, or that the structure is disposed "directly" on said another structure, or that the structure is disposed "indirectly" on said another structure via an additional structure.

The terms "a", "an", "the", "said" and "at least one of " are used to indicate the presence of one or more elements/components/etc., the terms "including" and "having" are used to indicate an open-ended inclusive meaning and that additional elements/components/etc. may be present in addition to the listed elements/components/etc. The terms "first", "second", "third" and the like are used only as labels and are not intended to limit the number of the objects thereof.

FIG. 1 shows a schematic structure diagram of a display device according to an embodiment of the present disclosure. As shown in FIG. 1, the display device may include a signal source part 10, a display part 30, and a transmission part 20, and the signal source part 10 may be connected to the display part 30 through the transmission part 20. The signal source part 10 may include a power supply module 10, and the power supply module 10 may include a voltage output end Vout and a voltage feedback end FB. The voltage output end Vout is configured to output a power supply signal, and the voltage feedback end FB is configured to obtain a feedback voltage signal. The power supply module 10 is configured to adjust the power supply signal based on the feedback voltage signal. The transmission part 20 may include: a first transmission line L1, including a first end connected to the voltage output end Vout and a second end outputting, the power supply signal; and a second transmission line L2, provided separately from the first transmission line L1, and including a first end connected to the voltage feedback end FB and a second end connected to the second end of the first transmission line L1.

In the display device provided in the present disclosure, the transmission part 20 is provided with the first transmission line L1 and the second transmission line L2, the second transmission line L2 is provided separately from the first transmission line L1, and the second end of the second transmission line L2 is connected to the first transmission line L1 at the second end of the first transmission line L1, therefore a voltage signal collected by the second transmission line L2 is an actual power supply signal after being subjected to line loss. The second transmission line L2 transmits this actual power supply signal to the feedback voltage end of the power supply module 11, so that the power supply module 11 can adjust the output voltage based on this actual power supply signal, and thus the end of the transmission part 20 connected to the display part 30 can output a stable target voltage, which can solve not only the problems of display horizontal stripe and display flicking caused by logic voltage drop, but also the problems of brightness drop, Gamma drift and CIE overspecification caused by EL voltage drop.

As shown in FIG. 1, in an exemplary embodiment, the first transmission line L1 is a voltage output line for outputting the power supply signal from the power supply module 11 to the display part, and the second transmission line L2 is a voltage feedback line for collecting the actual power supply signal to the display part as the feedback voltage signal and transmitting the same to the power supply module 11. As shown in FIG. 1, in an exemplary embodiment, the transmission part 20 may include a first connector J1 and a second connector J2. The first connector J1 may be connected to the signal source part 10, and the second connector J2 may be connected to the display part 30. The second transmission line L2 may be connected to the first transmission line L1 at an end of the second connector J2 to collect the actual power supply signal output by the transmission part 20. That is, in an exemplary embodiment, the second end of the first transmission line L1 refers to an end of the first transmission line L1 connected to the second connector J2. In other words, the second transmission line L2 is connected to the first transmission line L1 at the output end of the first transmission line L1. Since there is a certain impedance in the line, when the current of the power supply signal is high, a voltage drop loss is inevitably generated on the line. In the exemplary embodiment, the second end of the second transmission line L2 is connected to the output end of the first transmission line L1, therefore the second transmission line L2 may collect an actual power supply signal after being subjected to line loss, and thus the power supply module 11 adjusts the power supply signal at the voltage output end Vout based on this actual power supply signal, so that the power supply signal at the voltage output end Vout can output a stable target voltage at the remote end after being subjected to line loss to match the demand voltage of the display part 30. It is to be understood that structures of the first connector J1 and the second connector J2 may be set specifically according to connector structure of the signal source part 10 and the display part 30, which is not limited in the present disclosure.

In an exemplary embodiment, the power supply module 11 may be an integrated chip, such as a power management chip, and the power supply module 11 may adjust the output power supply signal based on the feedback voltage signal by means of a built-in algorithm, The specific method for adjusting the voltage by the power supply module 11 is not limited in the present disclosure.

Figure 2:
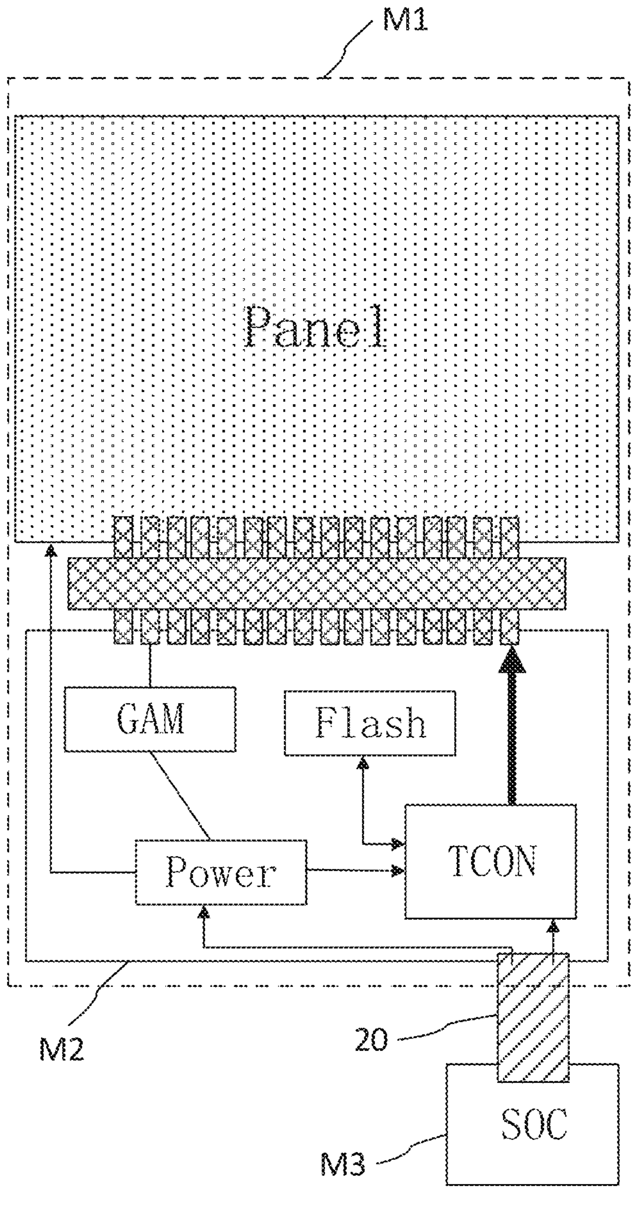
FIG. 2 shows a schematic structure diagram of a display device according to another embodiment of the present disclosure.

In an exemplary embodiment, the display device may be, for example, a vehicle-mounted terminal, a tablet computer, and the like. FIG. 2 shows a schematic structure diagram of a display device according to another embodiment of the present disclosure. As shown in FIG. 2, in an exemplary embodiment, the signal source part 10 may correspond to an SOC part M3 in FIG. 2, and the SOC part M3 may include a system control circuit board. The display part 30 may correspond to a panel part M1 in FIG. 2, and the panel part M1 may include a PCB drive circuit board M2 connected to a display panel. The PCB drive circuit board M2 is integrated with various devices such as a POWER IC chip providing the power supply signal to the display panel, a TCON chip providing a display signal, and a GAM chip. In an exemplary embodiment, the power supply module 11 is disposed in the SOC part, which may effectively reduce the volume of the PCB drive circuit board M2, and may avoid temperature increasing in the PCB drive circuit board M2, The PCB drive circuit board M2 may be connected to the system control circuit board M3 via the transmission part 20 provided in the exemplary embodiment to compensate for line loss voltage drop.

Figure 3:
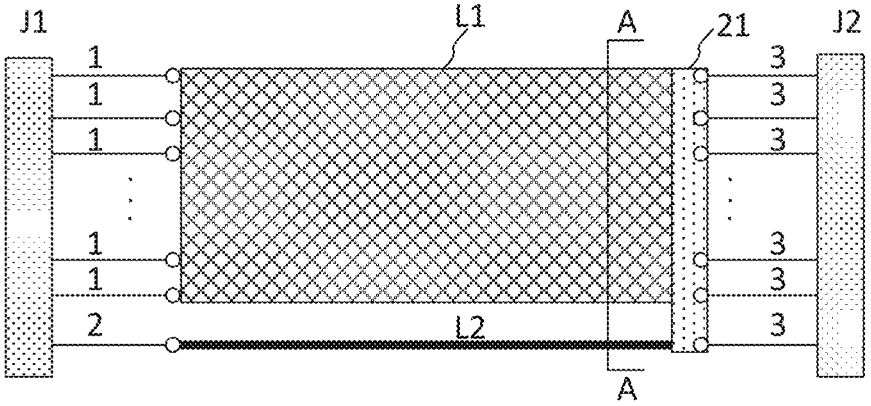
FIG. 3 is a schematic structure diagram of a transmission part in FIG. 1.

FIG. 3 shows a schematic structure diagram of the transmission part in FIG. 1. As shown in FIG. 3, in an exemplary embodiment, the first connector J1 may include a first pin 1 and a second pin 2. The first pin 1 may be connected to the first transmission line L1 and the second pin 2 may be connected to the second transmission line L2. After the first connector J1 is inserted into the signal source part 10, the first transmission line L1 in the transmission part 20 is connected to the voltage output end Vout of the power supply module 11 via the first pin 1, and the second transmission line L2 in the transmission part 20 is connected to the voltage feedback end FB of the power supply module 11 via the second pin 2. The second connector J2 may include a third pin 3 which is connected to the first transmission line L1. After the second connector J2 is inserted into the display part 30, the first transmission line L1 in the transmission part 20 outputs the power supply signal to the corresponding chip of the display part 30 via the third pin 3.

As shown in FIG. 3, in an exemplary embodiment, a line width of the first transmission line L1 may be set to be greater than a line width of the second transmission line L2. Both the first transmission line L1 and the second transmission line L2 may be copper lines. Because of the high current of the power supply signal, the line width of the first transmission line L1 may be set to be relatively large so that the first transmission line L1 may transmit a higher current supply signal. For example, the line width of the first transmission line L1 is d1, the line width of the second transmission line L2 is d2, and d1/d2 may be set to greater than or equal to 3 and less than or equal to 10, for example d1/d2 may be 3, 4, 5, 6, 7, 8, 9, 10, etc., depending on the current of the power supply signal to be transmitted by the first transmission line L1. In addition, the first transmission line L1 and the second transmission line L2 may be set to have the same characteristics, except that the line widths are different.

As shown in FIG. 3, in an exemplary embodiment, a first conductive part 21 may be provided at an end of the second connector J2, and the second transmission line L2 and the first transmission line L1 may be connected to the first conductive part 21, so that the second transmission line L2 is connected to the first transmission line L1 at the output end of the transmission part 20 by the first conductive part 21 to capture the actual power supply signal after being subjected to transmission loss. By providing the first conductive part 21, the wiring length of the first transmission line L1 may be reduced, i.e., at the end of the second connector J2, the first transmission line L1 only needs to be extended to the first conductive part 21, which is then connected to the third pin 3 at end of the second connector J2. In an exemplary embodiment, the advantage of providing the first conductive part 21 is that when the number of the third pins 3 that are needed to be connected to the end of the second connector J2 is relatively large or larger than the number of the first pins 1 at the end of the first connector J1, the line width of the first transmission line L1 may only need to withstand the current strength of the power supply signal, there is no need to widen the first transmission line L1 to cover all the third pins 3, and it only needs that the first conductive part 21 covers all of the third pins 3, which reduces the difficulty of wiring in the circuit board. Of course, in other exemplary embodiments, the first conductive part 21 may not be provided at the end of the first conductive part 21, and the second transmission line L2 may be connected to the first transmission line L1 directly at the end of the second connector J2.

Figure 4:
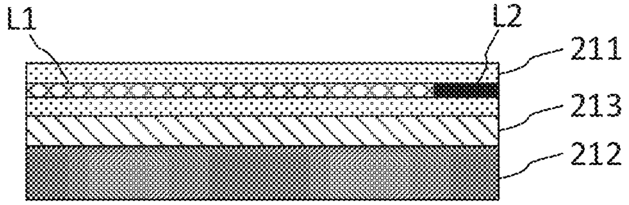
FIG. 4 shows a cross-sectional view of the transmission part in FIG. 3 taken along the AA direction.

FIG. 4 shows a cross-sectional view of the transmission part in FIG. 3 in the direction of AA. As shown in FIG. 4, in an exemplary embodiment, the transmission part 20 may include a first conductive layer 211 and a second conductive layer 212 with an insulating layer 213 provided between the first conductive layer 211 and the second conductive layer 212. The first transmission line L1 and the second transmission line L2 may be both provided in the first conductive layer 211 or the second conductive layer 212, i.e., in the same conductive layer, which may simplify the wiring and reduces the wiring difficulty. Of course, in other exemplary embodiments, the first transmission line L1 and the second transmission line L2 may also be provided in different conductive layers, for example, the first transmission line L1 is provided in the first conductive layer 211 and the second transmission line L2 is provided in the second conductive layer 212, and the like, which all belong to the protection scope of the present disclosure.

In an exemplary embodiment, a single pin is difficult to withstand the large current of the power supply signal output by the power supply module 11 of the signal source part 10, so the first connector J1 may include a plurality of first pins 1 provided in parallel, and the second connector J2 may include a plurality of third pins 3 provided in parallel. By providing multiple pins for current shunting, it may avoid burning down of the pin by the current. It is to be understood that the first transmission line L1 connects a plurality of first pins 1 at the end of the first connector J1 and connects a plurality of third pins 3 at the end of the second connector J2 to output the power supply signal.

Figure 5:
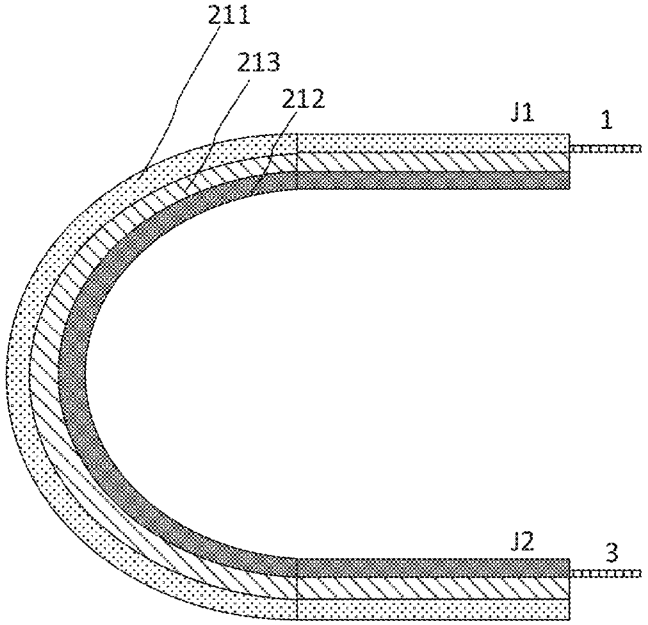
FIG. 5 is a schematic structure diagram of a connection state of a transmission part with a signal source part and a display part according to an embodiment of the present disclosure.
Figure 6:
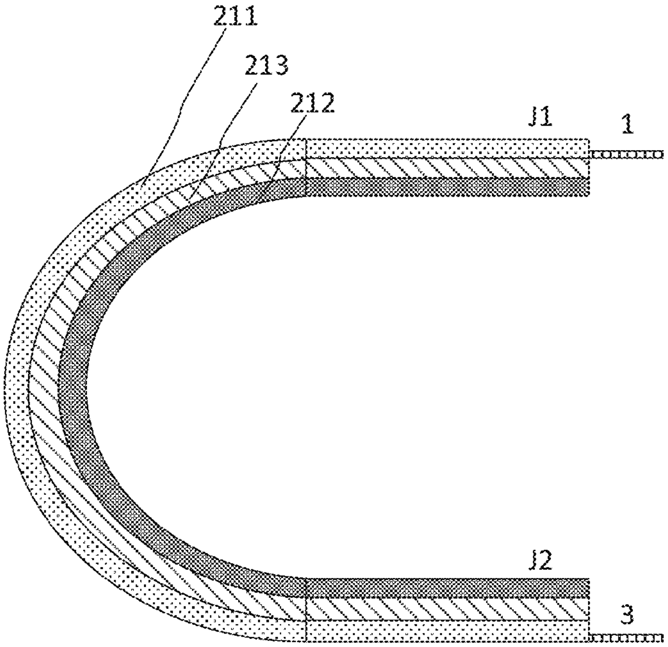
FIG. 6 is a schematic structure view of a connection state of a transmission part with a signal source part and a display part according to another embodiment of the present disclosure.

In an exemplary embodiment, the pins in the first connector J1 and the pins in the second connector J2 may be provided in different conductive layers or in the same conductive layer according to the connection manner of the system control circuit board M3 in the SOC part and the PCB drive circuit M2 in the panel part. For example, FIG. 5 shows a schematic structure diagram of the connection state of the transmission part with the signal source part and the display part according to an embodiment of the present disclosure. As shown in FIG. 5, the transmission part 20 is bent in a U-shape to connect the first connector J1 to the system control circuit board M3 and connect the second connector J2 to the PCB drive circuit M2. If the connection of the first connector J1 to the system control circuit board M3 and the connection of the second connector J2 to the PCB drive circuit M2 are both on the same side of the circuit board where the transmission part 20 is provided, e.g., both on the upper side of the transmission part 20, the first pin 1 and the second pin 2 may be provided in a different conductive layer from the third pin 3, e.g., the first pin 1 and the second pin 2 are provided in the first conductive layer 211 and the third pin 3 is provided in the second conductive layer 212. Alternatively, FIG. 6 shows a schematic structure diagram of the connection state of the transmission part with the signal source part and the display part according to another embodiment of the present disclosure. As shown in FIG. 6, when the transmission part 20 is bent to be connected to the system control circuit board M3 and the PCB drive circuit M2 respectively at the two sides of the circuit board where the transmission part 20 is provided, the first pin 1 and the second pin 2 may be provided in the same conductive layer as the third pin 3, for example, all the first pin 1, second pin 2 and third pin 3 are provided in the first conductive layer 211 or in the second conductive layer 212. In addition, in an exemplary embodiment, the pins in the first connector J1 and the pins in the second connector J2 may be provided in the same conductive layer as or in a different conductive layer from the first transmission line L1 and the second transmission line L2, For example, the first pin 1, the second pin 2, the first transmission line L1 and the second transmission line L2 may all be provided in the first conductive layer 211, and the third pin 3 is provided in the second conductive layer 212; or, the first pin 1, the second pin 2, the first transmission line L1 and the second transmission line L2 are all provided in the second conductive layer 212, and the third pin 3 is provided in the first conductive layer 211; or, the first pin 1 and the second pin 2 are provided in the first conductive layer 211, and the first transmission line L1, the second transmission line L2 and the third pin 3 are all provided in the second conductive layer 212; or, the first pin 1 and the second pin 2 are provided in the second conductive layer 212, and the first transmission line L1 the second transmission line L2 and the third pin 3 are all provided in the first conductive layer 211; or, the first pin 1, the second pin 2, the first transmission line L1, the second transmission line L2 and the third pin 3 are all provided in the first conductive layer 211 or the second conductive layer 212, which all fall within the protection scope of the present disclosure.

Figure 7:
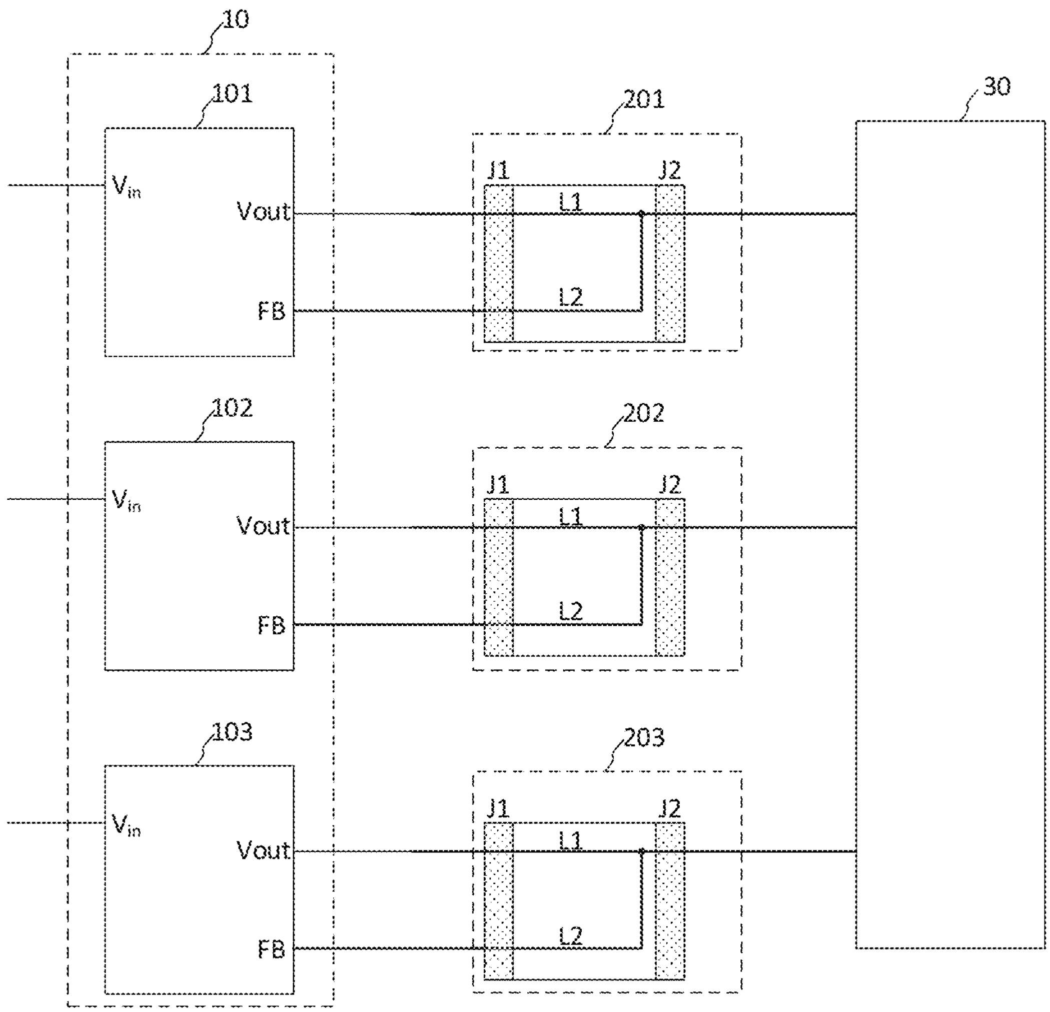
FIG. 7 is a schematic structure diagram of a display device according to another embodiment of the present disclosure.

As shown in FIG. 2, in an exemplary embodiment, the panel part typically includes different chips such as a power management chip, a TCON chip, etc., to control the panel for light-emitting display. It may he appreciated that the different chips may require different power supply signals from each other, i.e., in an exemplary embodiment, the signal source part 10 may provide several different types of power supply signals to the display part 30. For example, FIG. 7 shows a schematic structure diagram of a display device according to another embodiment of the present disclosure. As shown in FIG. 7, the signal source part 10 may include a first power supply module 101, a second power supply module 102 and a third power supply module 103. The first power supply module 101 may output a first power supply signal, and the first power supply signal may be for example an ELVDD signal, which is used as a first voltage signal for a pixel drive circuit in the display panel. The second power supply module 102 may output a second power supply signal, and the second power supply signal may be, for example, an ELVSS signal, which is used as a second voltage signal for the pixel drive circuit. The pixel drive circuit controls a light-emitting unit to emit light during a light-emitting phase according to a driving current generated by the voltage difference between the ELVDD signal and the ELVSS signal. The third power supply module 103 may output a third supply signal, which may be, for example, a VDD signal for powering a TCON chip. As shown in FIG. 7, in order to cooperate with the three power supply signals, the display device provided in an exemplary embodiment may include a first transmission part 201, a second transmission part 202 and a third transmission part 203. The first transmission part 201 may be connected to the first power supply module 101 for outputting a first power supply signal and outputting a first feedback voltage signal to the first power supply module 101; the second transmission part 202 may be connected to the second power supply part 102 for outputting a second power supply signal and outputting a second feedback voltage signal to the second power supply module 102; and the third transmission part 203 may be connected to the third power supply module 103 for outputting a third power supply signal and outputting a third feedback voltage signal to the third power supply module 103, It is to be understood that the first transmission part 201, the second transmission part 202, and the third transmission part 203 each includes the first transmission line L1 and the second transmission line L2.

Figure 8:
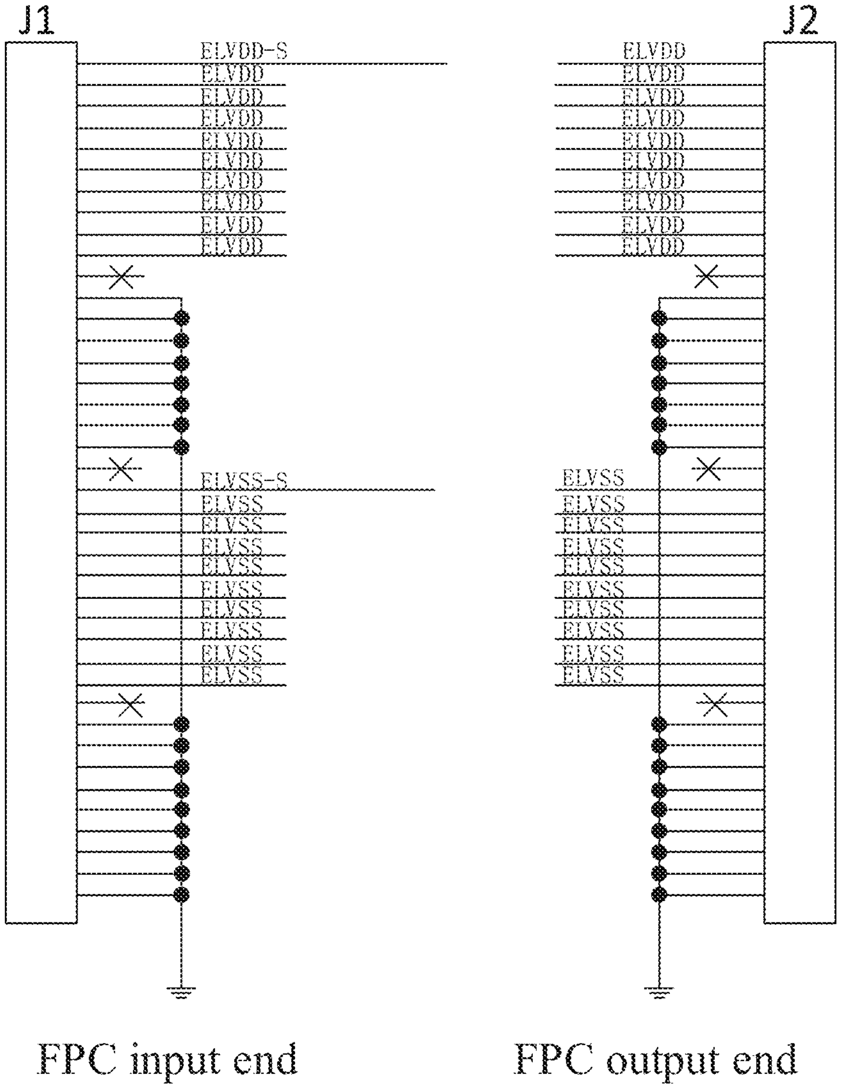
FIG. 8 is a schematic diagram of pins of a first transmission part and a second transmission part according to an embodiment of the present disclosure.
Figure 9:
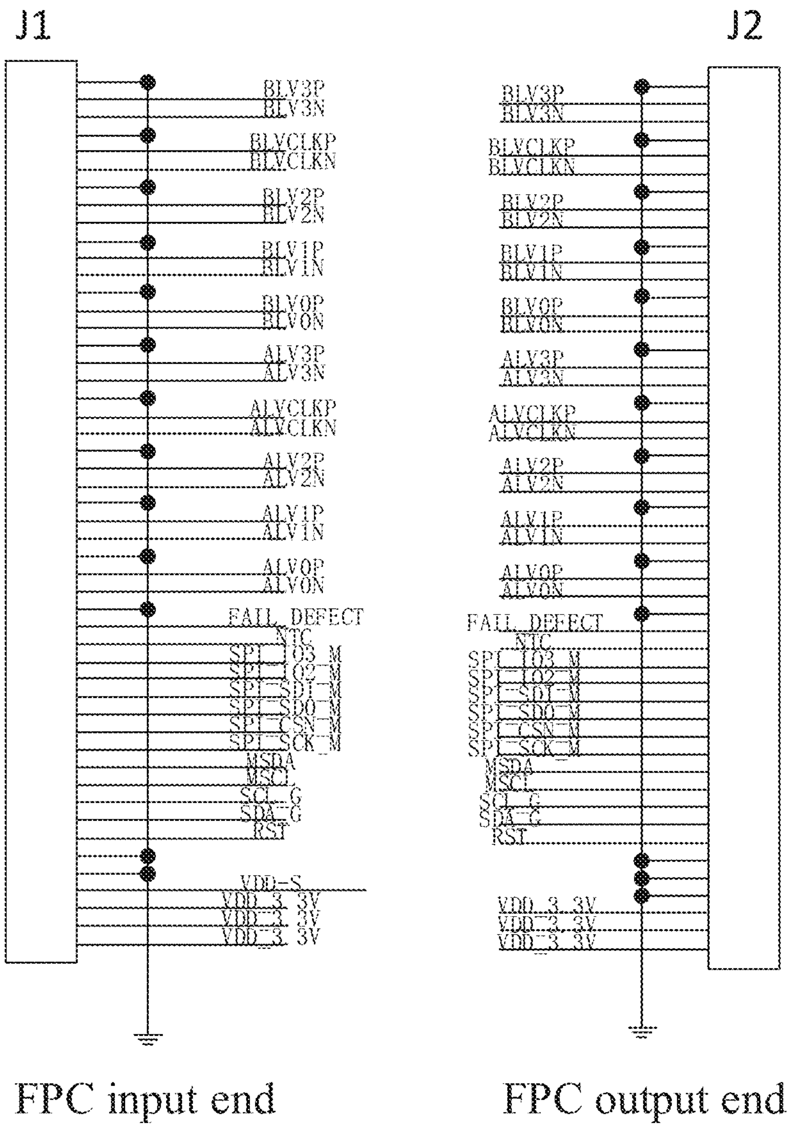
FIG. 9 is a schematic diagram of a pin of a third transmission part according to an embodiment of the present disclosure.

FIG. 8 shows a schematic diagram of the pins of the first transmission part and the second transmission part according to an embodiment of the present disclosure, and FIG. 9 shows a schematic diagram of the pins of the third transmission part according to an embodiment of the present disclosure. As shown in FIGS. 8 and 9, in an exemplary embodiment, the first transmission part 201 for transmitting the first power supply signal and the second transmission part 202 for transmitting the second power supply signal are provided on the same circuit board, and the third transmission part 203 for transmitting the third power supply signal may be provided on another circuit board. The circuit board may be, for example, a flexible circuit board FPC, and the display device may include two circuit boards, i.e., a first FPC board and a second FPC board. As shown in FIG. 8, the first transmission part 201 and the second transmission part 202 are both provided on the first FPC board, and the first connector J1 and the second connector J2 in the first FPC board each has 40 pins. As shown in FIG. 9, the third transmission part 203 is provided on the second FPC board, and the first connector J1 and the second connector J2 in the second FPC board each has 50 pins, Furthermore, the second FPC board may further transmit other signals such as display control signal. In addition, as shown in FIG. 8, in the first transmission part 201, a plurality of pins for transmitting the ELVDD signal are arranged in order, the pin at the first place for transmitting the ELVDD signal may be used as the second pin 2, and the other pins for transmitting the ELVDD signal may be used as the first pin 1. The second transmission part 202 and the third transmission part 203 may have a similar structure. Of course, in other exemplary embodiments, the first transmission part 201, the second transmission part 202 and the third transmission part 203 may also have other arrangements.

Figure 10:
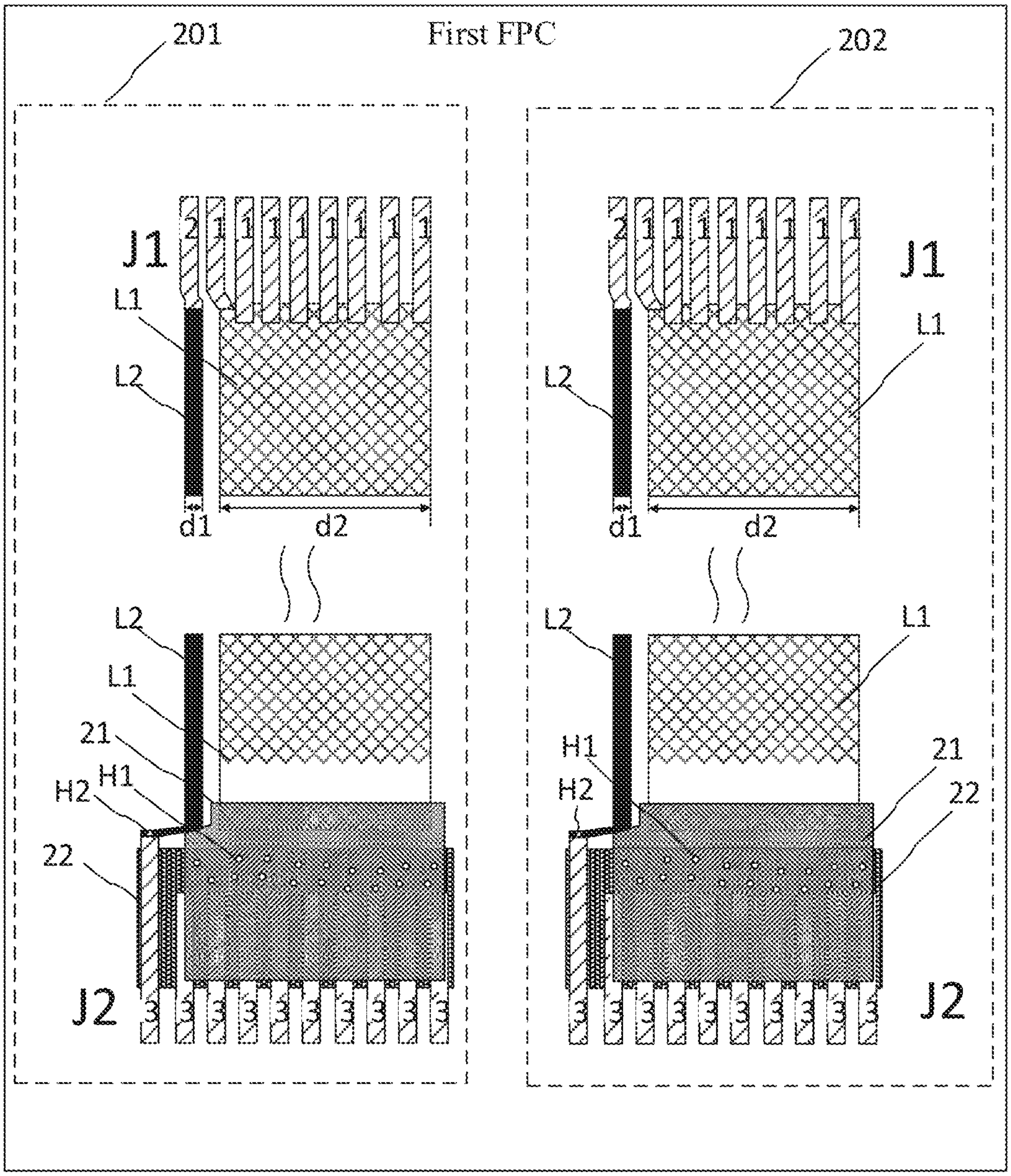
FIG. 10 is a top view of a stricture of a first transmission part according to an embodiment of the present disclosure.

The structure of the transmission part 20 is further described below in relation to the three different power supply modules. FIG. 10 shows a top view of a structure of the first transmission part according to an embodiment of the present disclosure. As shown in FIG. 10, in an exemplary embodiment, in the first transmission part 201, the first pin 1, the second pin 2, the first transmission line L1 and the second transmission line L2 are all provided in the first conductive layer 211, and the third pin 3 is provided in the second conductive layer 212. The first transmission part 201 may further include a first conductive part 21 and a second conductive part 22 provided at the end of the second connector J2, the first conductive part 21 may be provided in the first conductive layer 211, and the second conductive part 22 may be provided in the second conductive layer 212 opposite to the first conductive part 21 and be connected to the first conductive part 21 through a via hole. The first conductive part 21 and the second conductive part 22 are provided opposite to each other in such a way that the orthographic projection of the first conductive part 21 on the insulating layer 213 and the orthographic projection of the second conductive part 22 on the insulating layer 213 are overlapped. The arrangement of the first conductive part 21 may reduce the wiring length of the first transmission line L1, i.e., the first transmission line L1 only needs to be extended to the first conductive part 21 at the end of the second connector J2. The first conductive part 21 is connected to the first transmission line L1 at the end of the second connector J2 and is connected to the second conductive part 22 provided in the second conductive layer 212 through a via hole H1. At the same time, the second transmission line L2 may be connected to the second conductive part 22 through a via hole H2, and thus may be connected to the first transmission line L1 at the end of the second connector J2 to capture the output voltage of the first transmission part 201. As can be seen from FIG. 10, the second transmission line L2 may not be connected to the first conductive part 21, but directly connected to the second conductive part 22 through the via, hole H2. Furthermore, it is to be understood that a plurality of via holes H1 may be provided to connect the first conductive part 21 and the second conductive part 22 to ensure that the first conductive part 21 and the second conductive part 22 are sufficiently electrically connected. In addition, in other exemplary embodiments, the second transmission line L2 may also be directly connected to the first conductive part 21.

As shown in FIG. 10, in an exemplary embodiment, in the first transmission part 201, the number of the third pins 3 at the end of the second connector J2 may be larger than the number of the first pins 1 in the first connector J1. For example, the current of the first power supply signal is about 2A, 9 first pins 1 may be provided at the end of the first connector J1, and the first supply signal is shunted by the 9 first pins 1 without burning the first pin 1. Further, 10 third pins 3 may be provided at the end of the second connector J2 to match the number of pins by which the ELVDD Power IC in the display part 30 obtains the first power supply signal. On this basis, the width of the second conductive part 22 may be provided to be greater than the width of the first conductive part 21. For example, the width of the second conductive part 22 may be substantially equal to the width of the area where the 10 third pins 3 are located, so that the second conductive part 22 may be connected to each of the third pins 3, and the first conductive part 21 does not need to cover all of the third pins 3. Furthermore, the width of the first conductive part 21 may be provided to be substantially equal to or slightly greater than the width of the first transmission line L1. It is to be understood that in other exemplary embodiments, the number of first pins 1 at the end of the first connector J1 may also be the same as the number of third pins 3 at the end of the second connector J2, for example, both the numbers of the first pins 1 and the second pins 2 may be set to be 10 and the like, which are within the protection scope of the present disclosure.

In an exemplary embodiment, the width of the conductive part may be understood as the distance of the conductive part in the arrangement direction of the pins.

As shown in FIG. 10, in an exemplary embodiment, in the first transmission part 201, the line width of the first transmission line L1 is d1, the line width of the second transmission line L2 is d2, and d1/d2 may be set to be greater than or equal to 8 and less than or equal to 10, for example, it may be 8, 8,5, 9, 9.5, 10, and the like. In an exemplary embodiment, the line width of the transmission part may be understood as the distance in a direction perpendicular to the extending direction of the transmission part in the plane in which the transmission part is located.

In addition, in an exemplary embodiment, the second transmission part 202 may have the same structure as the first transmission part 201, which will not be described in the embodiment.

Figure 11:
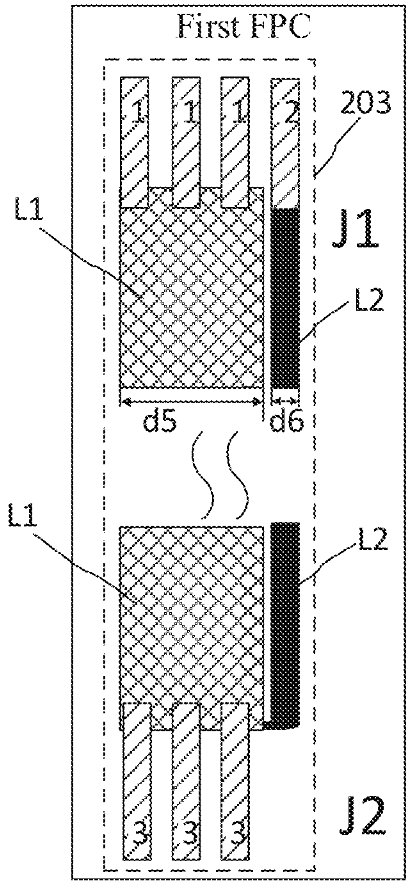
FIG. 11 is a top view of a structure of a first transmission part according to an embodiment of the present disclosure.

FIG. 11 shows a top view of the structure of the first transmission part according to an embodiment of the present disclosure. As shown in FIG. 11, in an exemplary embodiment, in the third transmission part 203, the number of the first pins 1 in the first connector J1 may be the same as the number of the third pins 3 in the second connector J2, the first transmission line L1 may be directly connected to the first pin 1 and the third pin 3, and the second transmission line L2 may be directly connected to the second pin 2 and may be connected to the first transmission line L1 at the end of the second connector J2. In other exemplary embodiments, for example, each of the first connector J1 and the second connector 32 may include a first conductive part 21. At an end of the first connector J1, the first conductive part 21 may be connected between the first transmission line L1 and the first pin 1, and at an end of the second connector J2, the first conductive part 21 is connected between the first transmission line L1 and the third pin 3. The second transmission line L2 may be connected to the first conductive part 21 so as to be connected to the second end of the first transmission line L1.

As shown in FIG. 11, in an exemplary embodiment, in the third transmission part 203, the line width of the first transmission line L1 is d5, the line width of the second transmission line L2 is d6, and d5/d6 may be set to be greater than or equal to 2 and less than or equal to 4, for example, it may be 2, 2.53, 3.2, 3.4, 3.5, 3.6, 3.8, 4, and the like.

Furthermore, in an exemplary embodiment, the line width of the first transmission line L1 in the first transmission part 201 may be greater than the line width of the first transmission line L1 in the third transmission part 203, for example, the line width of the first transmission line L1 in the first transmission part 201 is d1, the line width of the first transmission line L1 in the third transmission part 203 is d5, and d1/d5 may be set to be greater than or equal to 2 and less than or equal to 4, for example, it may be 2, 2.5, 3, 3.5. 4, and the like. Similarly, the line width of the first transmission line L1 in the second transmission part 202 is d3, and d3/d5 may be set to be greater than or equal to 2 and less than or equal to 4, for example, it may be 2, 2.5, 3, 3.5, 4, and the like.

Figure 12:
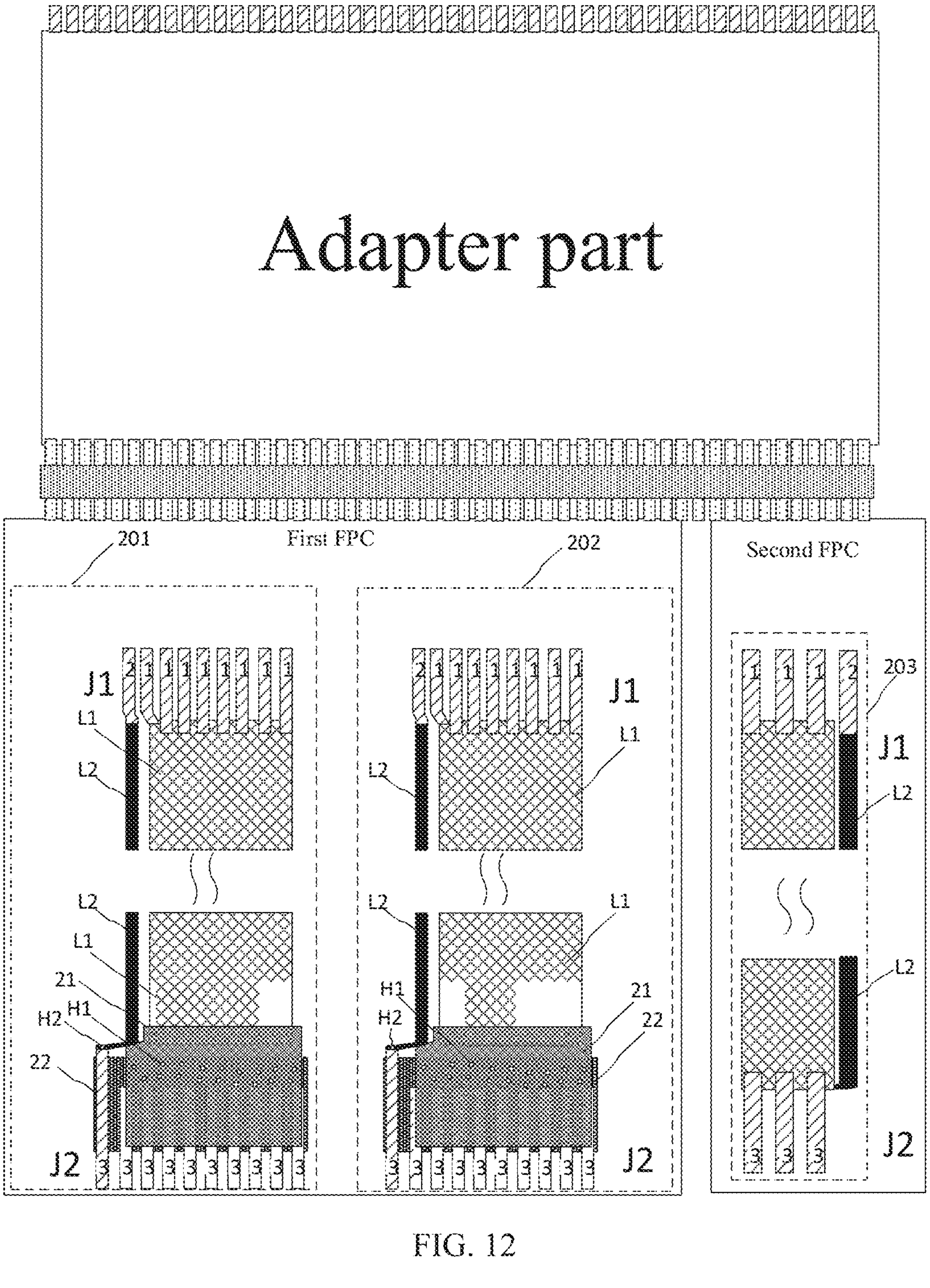
FIG. 12 is a schematic structure diagram of a display device according to another embodiment of the present disclosure.

FIG. 12 shows a schematic structure diagram of a display device according to another embodiment of the present disclosure. As shown in FIG. 12, in an exemplary embodiment, the display device may further include an adapter part with an end that may be connected to the signal source part 10 and another end which is respectively connected to the first end of the first transmission part 201, the first end of the second transmission part 202 and the first end of the third transmission part 203. The second end of the first transmission part 201, the second end of the second transmission part 202 and the second end of the third transmission part 203 are connected to the display part 30. For example, the adapter part may be a connector having 90 pins which connects a first FPC having 40 pins and a second FPC having 50 pins as a single unit. In an exemplary embodiment, the first transmission part 201, the second transmission part 202 and the third transmission part 203 are connected in one unit by means of the adapter part, so that at the signal source part, the system control boards may be connected by this adapter part with only one plugging/unplugging operation, making the operation more convenient. This structure may be used in a test phase, for example in a factory test phase where frequent plugging/unplugging operations are required, which simplifies the operation with fewer errors. Since the first transmission part 201, the second transmission part 202, and the third transmission part 203 have the structure of the above-described embodiment of the present disclosure, they can compensation for the voltage drop at the remote end during the test phase, making the test results more accurate.

Figure 13:
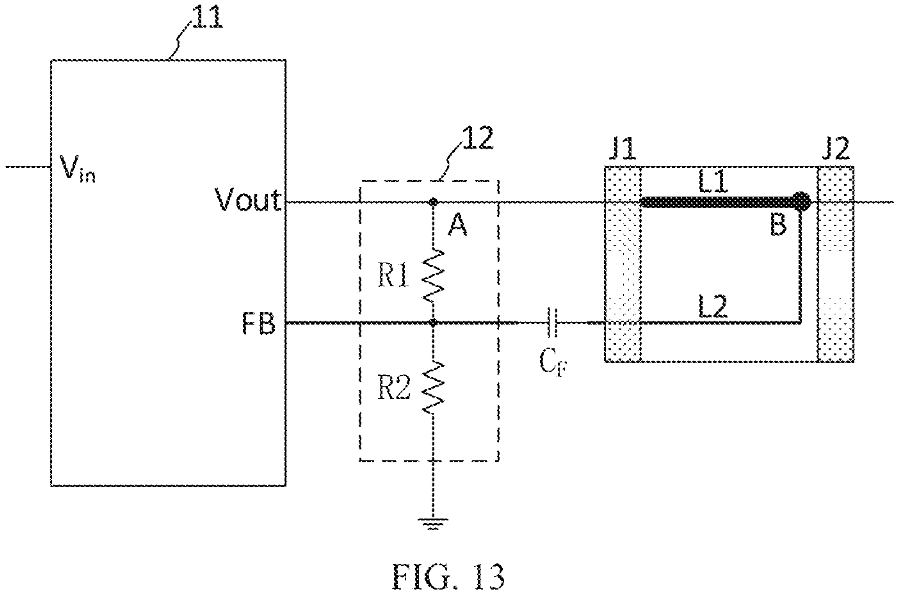
FIG. 13 is a schematic diagram of a voltage drop compensation circuit according to an embodiment of the present disclosure.

In addition, the present disclosure also provides a voltage drop compensation circuit which can be applied to the display device described in any embodiment of the present disclosure. FIG. 13 shows a schematic diagram of a voltage drop compensation circuit according to an embodiment of the present disclosure. As shown in FIG. 13, a voltage division module 12 may be connected between the voltage output end Vout and the voltage feedback end FB of the power supply module 11. By adjusting a voltage division ratio of the voltage division module 12, the collected feedback voltage signal may be set within a specified voltage range of the voltage feedback end FB Then the power supply module 11 may adjust the amplitude of the power supply signal output from the voltage output end Vout through a built-in algorithm, so that the power supply signal output from the voltage output end Vout matches the voltage required by the display part, i.e., the power supply module 11 outputs a stable target voltage. In an exemplary embodiment, there is a certain line resistance between nodes AB, and thus the line between the nodes AB may be equivalent to an equivalent resistance, therefore there is a certain voltage drop between the nodes A and B, and the voltages at the nodes A and B are not the same. The voltage division module 12 may be a resistive voltage division module, for example, the voltage division module 12 may include a first resistor R1 and a second resistor R2, a an end of the first resistor R1 is used as an input end of the voltage division module 12, another end of the first resistor R1 is connected to an end of the second resistor R2, another end of the second resistor R2 is grounded, and the common connection end of the first resistor R1 and the second resistor R2 is used as the output end of the voltage division module 12. Furthermore, as shown in FIG. 13, in an exemplary embodiment, the voltage drop compensation circuit may also include a filter capacitor CF with an end which is connected to the input end of the voltage division module 12 and another end which is connected to the output end of the voltage division module 12. The filter capacitor CF filters out spurious signals so that the voltage division module 12 may output a stable feedback power supply signal to the voltage feedback terminal FB.

A person skilled in the art may easily conceive other embodiments of the present disclosure upon consideration of the specification and practice of the invention disclosed herein. The present application is intended to cover any variation, use or adaptation of the present disclosure that follows the general principle of the present disclosure and includes a common knowledge or conventional technical means in the art that is not disclosed herein. The specification and embodiments are to be considered exemplary only and the true scope and spirit of the present disclosure is indicated by the appended claims.

What is claimed is:

1. A display device, comprising a signal source part, a display part and a transmission part, and the signal source part being connected to the display part through the transmission part, wherein the signal source part comprises:

a power supply module, comprising a voltage output end and a voltage feedback end, the voltage output end being configured to output a power supply signal, the voltage feedback end being configured to obtain a feedback voltage signal, and the power supply module being configured to adjust the power supply signal based on the feedback voltage signal, the transmission part comprises:

a first transmission line, comprising a first end connected to the voltage output end and a second end outputting the power supply signal; and a second transmission line, provided separately from the first transmission line, and comprising a first end connected to the voltage feedback end and a second end connected to the second end of the first transmission line, wherein the transmission part comprises:

a first connector, connected to the signal source part and comprising a first pin and a second pin, the first pin being connected to the first transmission line, the second pin being connected to the second transmission line, and the first connector being connected to the voltage output end through the first pin and to the voltage feedback end through the second pin; and a second connector, connected to the display part, the first transmission line being connected to the second transmission line at an end of the second connector, wherein the display device comprises a plurality of the transmission parts, wherein the signal source part comprises a plurality of the power supply modules, and the plurality of the power supply modules are configured to output a plurality of different power supply signals, and wherein the plurality of the transmission parts are provided in one-to-one correspondence with the plurality of the power supply modules.

2. The display device according to claim 1, wherein the plurality of the power supply modules comprise a first power supply module, a second power supply module and a third power supply module, the first power supply module is configured to output a first power supply signal, the second power supply module is configured to output a second power supply signal and the third power supply module is configured to output a third power supply signal, and voltage magnitudes of the first power supply signal, the second power supply signal, and the third power supply signal are different from each other, wherein the plurality of the transmission parts comprise a first transmission part, a second transmission part and a third transmission part, and wherein the first transmission part and the second transmission part are provided on a first circuit board, and the third transmission part is provided on a second circuit board.

3. The display device according to claim 2, wherein the transmission part comprises a first conductive layer and a second conductive layer, and the first conductive layer is insulated from the second conductive layer, and the second connector comprises a third pin, and the third pin is connected to the first transmission line, and wherein the first pin, the second pin, the first transmission line and the second transmission line are all located in the first conductive layer, and the third pin is located in the second conductive layer; or the first pin, the second pin, the first transmission line and the second transmission line are all located in the second conductive layer, and the third pin is located in the first conductive layer; or the first pin and the second pin are located in the first conductive layer, and the first transmission line, the second transmission line and the third pin all are located in the second conductive layer; or the first pin and the second pin are located in the second conductive layer, and the first transmission line, the second transmission line and the third pin all are located in the first conductive layer; or the first pin, the second pin, the first transmission line, the second transmission line and the third pin are located in the first conductive layer or the second conductive layer.

4. The display device according to claim 3, wherein the first connector comprises a plurality of the first pins, and the plurality of the first pins are provided in parallel, and the second connector comprises a plurality of the third pins, and the plurality of the third pins are provided in parallel, and wherein the plurality of the first pins are each connected to a first end of the first transmission line, and the plurality of the third pins are each connected to the second end of the first transmission line.

5. The display device according to claim 4, wherein the first pin, the second pin, the first transmission line and the second transmission line are all located in the first conductive layer, and the third pin is located in the second conductive layer, the first transmission part and the second transmission part each comprises:

a first conductive part, provided at the end of the second connector, located in the first conductive layer, and connected to the second end of the first transmission line; and a second conductive part, located in the second conductive layer, provided to be opposite to the first conductive part, and connected to the first conductive part through a via hole, and wherein in each of the first transmission part and the second transmission part, the second conductive part is further connected to the second transmission line and to each of the plurality of the third pins.

6. The display device according to claim 5, wherein a width of the second conductive part is greater than a width of the first conductive part.

7. The display device according to claim 4, wherein in the first transmission part, a number of the third pins is greater than a number of the first pins, in the second transmission part, the number of the third pins is greater than the number of the first pins, and in the third transmission part, the number of the third pins is the same as the number of the first pins.

8. The display device according to claim 1, wherein a line width of the first transmission line is greater than a line width of the second transmission line.

9. The display device according to claim 2, wherein in the first transmission part, a line width of the first transmission line is d1, a line width of the second transmission line is d2, and d1/d2 is greater than or equal to 8 and less than or equal to 10;

in the second transmission part, the line width of the first transmission line is d3, the line width of the second transmission line is d4, and d3/d4 is greater than or equal to 8 and less than or equal to 10; and in the third transmission part, the line width of the first transmission line is d5, the line width of the second transmission line is d6, and d5/d6 is greater than or equal to 2 and less than or equal to 4.

10. The display device according to claim 9, wherein d1/d5 is greater than or equal to 2 and less than or equal to 4, and d3/d5 is greater than or equal to 2 and less than or equal to 4.

11. The display device according to claim 2, wherein the display device further comprises an adapter part, the adapter part comprises an end connected to the signal source part and another end connected to a first end of the first transmission part, a first end of the second transmission part and a first end of the third transmission part, and a second end of the first transmission part, a second end of the second transmission part and a second end of the third transmission part are connected to the display part.

12. A voltage drop compensation circuit, applied to the display device according to claim 1, wherein the voltage drop compensation circuit comprises:

the power supply module, provided in the signal source part and comprising:

the voltage output end configured to output a power supply signal, and the feedback voltage end configured to obtain a feedback voltage signal; and a voltage division module, comprising an input end connected to the voltage output end and an output end connected to the feedback voltage end, and configured to determine, according to a predetermined voltage division ratio, the feedback voltage signal based on an output voltage signal of the voltage output end, wherein the power supply module is configured to adjust the power supply signal output from the voltage output end based on the feedback voltage signal.

13. The voltage drop compensation circuit according to claim 12, wherein the voltage division module comprises:

a first resistor, comprising a first end as the input end of the voltage division module; and a second resistor, comprising a first end, as the output end of the voltage division module, connected to a second end of the first resistor, and a second end being grounded.

14. The voltage drop compensation circuit according to claim 12, further comprising:

a filter capacitor, comprising an end connected to the input end of the voltage division module and another end connected to the output end of the voltage division module.

15. The display device according to claim 1, further comprising a voltage drop compensation circuit, wherein the voltage drop compensation circuit comprises:

a voltage division module, comprising an input end connected to the voltage output end and an output end connected to the feedback voltage end, and configured to determine, according to a predetermined voltage division ratio, the feedback voltage signal based on an output voltage signal of the voltage output end.

16. The display device according to claim 15, wherein the voltage division module comprises:

a first resistor, comprising a first end as the input end of the voltage division module; and a second resistor, comprising a first end, as the output end of the voltage division module, connected to a second end of the first resistor, and a second end being grounded.

17. The display device according to claim 15, wherein he voltage drop compensation circuit further comprises:

a filter capacitor, comprising an end connected to the input end of the voltage division module and another end connected to the output end of the voltage division module.

* * * * *